(12) United States Patent
Petrak et al.

(10) Patent No.: US 11,084,383 B2
(45) Date of Patent: Aug. 10, 2021

(54) CONTROL SYSTEM AND METHOD FOR VEHICLES WITH DYNAMIC BRAKING

(71) Applicant: GE Global Sourcing LLC, Norwalk, CT (US)

(72) Inventors: Edward Thomas Petrak, Lawrence Park, PA (US); Henry Todd Young, Erie, PA (US); Jeffrey Wolff, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 122 days.

(21) Appl. No.: 16/390,857

(22) Filed: Apr. 22, 2019

(65) Prior Publication Data

US 2019/0329655 A1  Oct. 31, 2019

Related U.S. Application Data

(60) Provisional application No. 62/663,761, filed on Apr. 27, 2018.

(51) Int. Cl.
*B60L 7/08* (2006.01)
*B60L 15/20* (2006.01)
*B60L 7/22* (2006.01)

(52) U.S. Cl.
CPC .................. *B60L 7/08* (2013.01); *B60L 7/22* (2013.01); *B60L 15/2009* (2013.01)

(58) Field of Classification Search
CPC ........... B60L 7/08; B60L 7/22; B60L 15/2009
See application file for complete search history.

(56) References Cited

U.S. PATENT DOCUMENTS

| 2006/0069487 A1 | 3/2006 | Sychra et al. |
| 2010/0066294 A1* | 3/2010 | Hendrickson ........... H02P 9/006 |
| | | 318/490 |

(Continued)

FOREIGN PATENT DOCUMENTS

| EP | 2657060 A1 | 10/2013 |
| JP | H04-207910 A | 7/1992 |
| JP | 2009-292239 A | 12/2009 |

OTHER PUBLICATIONS

Extended European Search Report for corresponding EP Application No. 19167482.9-1205 dated Jan. 9, 2020 (9 pages).

(Continued)

*Primary Examiner* — Anne Marie Antonucci
*Assistant Examiner* — Sahar Motazedi
(74) *Attorney, Agent, or Firm* — The Small Patent Law Group LLC; Philip S. Hof

(57) ABSTRACT

A control system includes a current sensor and one or more processors. The current sensor is configured to be disposed onboard a vehicle and to monitor a measured current conducted into a resistor leg of the vehicle. The resistor leg has a braking chopper and one or more resistive elements, and is connected with a traction bus of the vehicle. The one or more processors are configured to receive the measured current from the current sensor and, in response to the measured current differing from an expected current through the resistor leg, the one or more processors are configured to generate a control signal configured to one or more of increase an engine speed of an engine of the vehicle, increase cooling to the one or more resistive elements of the resistor leg, restrict movement of the vehicle, or schedule maintenance for the resistor leg.

20 Claims, 3 Drawing Sheets

(56) References Cited

U.S. PATENT DOCUMENTS

| | | | |
|---|---|---|---|
| 2010/0210412 A1* | 8/2010 | Kojima | F16H 61/66259 |
| | | | 477/38 |
| 2013/0152816 A1* | 6/2013 | Kral | B60L 3/04 |
| | | | 105/54 |
| 2014/0313621 A1* | 10/2014 | Innes | H02H 7/0833 |
| | | | 361/24 |
| 2016/0288666 A1 | 10/2016 | Kim et al. | |

OTHER PUBLICATIONS

Office Action dated Feb. 22, 2021 for corresponding Application No. Tokugan 2019079680 (4 pages).

* cited by examiner

CONTROL SYSTEM AND METHOD FOR VEHICLES WITH DYNAMIC BRAKING

CROSS-REFERENCE TO RELATED APPLICATIONS

This application claims priority to U.S. Provisional Patent Application No. 62/663,761, which was filed 27 Apr. 2018, and the entire disclosure of which is incorporated herein by reference.

FIELD

Embodiments of the inventive subject matter described herein generally relate to vehicle control. Certain embodiments relate to systems and methods for controlling off-highway vehicles that utilize braking choppers for dynamic braking modes of operation.

BACKGROUND

In the mining industry, large off-highway vehicles typically employ electrically motorized wheels for propelling and slowing the vehicle. For example, the off-highway vehicles may include large horsepower diesel engines in conjunction with alternators, rectifiers, inverters, and the like, that are connected to the wheels of the vehicles via traction motors. The alternator converts mechanical energy into electrical energy that is transmitted to the traction motors which transform the electrical energy back into mechanical energy to drive the wheels during a propel mode of operation.

When the engine power is not needed to propel an off-highway vehicle, such as when the vehicle is coasting or traveling along a downhill grade, the vehicle can transition to a dynamic braking mode. In the dynamic braking mode, the traction motors are reconfigured to operate as power generators. For example, the traction motors utilize mechanical energy from the rotation of the wheels to generate electrical energy, which slows the vehicle. Dynamic braking reduces or eliminates the use of friction-based braking. The electrical energy generated during dynamic braking is typically dissipated from the vehicle as heat through retarding grids of resistors and insulators, although in certain vehicles the electrical energy can be stored in batteries for later use.

In order to conserve fuel and increase fuel efficiency, certain off-highway vehicles reduce the engine speed of the engine while in the dynamic braking mode to a reduced idle speed because the engine power is not needed. In the dynamic braking mode, power flow from the engine is effectively shut off as the alternator AC electrical output is held at a level less than the regulated DC link (i.e. back biasing the rectifier). To DC link may be regulated dynamically by choppers that modulate effective link resistance as regenerative power varies to hold a desired DC voltage. When propulsive motive effort of the off-highway vehicle is again desired, the vehicle transitions from the dynamic braking mode to the propel mode, and engine power is once again used to rotate the wheels via the traction motors. The engine at the reduced idle speed associated with the dynamic braking mode may not be able to handle a significant power demand. If a braking chopper is defective or abnormal (i.e. one example would be a shorted chopper that is stuck in an "on" or conducting state), the abnormal braking chopper may not provide sufficient resistance to prevent a large power demand on the engine upon entering the propel mode. The large power demand on the engine while the engine is at a reduced speed may cause the engine to stall and/or the alternator to collapse. Stalling of the engine may disrupt not only the movement of the off-highway vehicle but also various vehicle systems that rely on continuous operation of the engine, such as hydraulic brakes and electrical control systems. Therefore, a mitigation strategy is needed to prevent stalling of the engine attributable to failed braking choppers when transitioning from the dynamic braking mode to the propel mode.

BRIEF DESCRIPTION

A control system includes a current sensor and one or more processors. The current sensor is configured to be disposed onboard a vehicle and to monitor a measured current conducted into a resistor leg of the vehicle. The resistor leg has a braking chopper and one or more resistive elements. The resistor leg is connected with a traction bus of the vehicle. The one or more processors are communicatively connected to the current sensor. The one or more processors are configured to receive the measured current from the current sensor and, in response to the measured current differing from an expected current through the resistor leg, the one or more processors are configured to generate a control signal configured to one or more of increase an engine speed of an engine of the vehicle, increase cooling to the one or more resistive elements of the resistor leg, restrict movement of the vehicle, or schedule maintenance for the resistor leg.

A method (e.g., for controlling a vehicle) includes calculating an expected current through a resistor leg electrically connected to a traction bus on a vehicle. The resistor leg includes a braking chopper. The method includes comparing the expected current through the resistor leg to a measured current through the resistor leg. The measured current is generated by a current sensor. In response to a difference between the expected current and the measured current exceeding a designated threshold, the method also includes generating, via one or more processors, a control signal configured to one or more of increase an engine speed of an engine of the vehicle, increase cooling to the one or more resistive elements of the resistor leg, restrict movement of the vehicle, or schedule maintenance for the resistor leg.

A control system includes a current sensor and one or more processors. The current sensor is configured to be disposed onboard a vehicle and to monitor a measured current conducted into a resistor leg of the vehicle. The resistor leg has a braking chopper and one or more resistive elements. The resistor leg is connected with a traction bus of the vehicle. The one or more processors are communicatively connected to the current sensor. The one or more processors are configured to control one or both of the braking chopper or a traction motor of the vehicle in both a dynamic mode of operation where electricity is generated by the traction motor and in a propel mode of operation where electricity is provided to the traction motor to move the vehicle. The one or more processors are configured to receive the measured current from the current sensor, and, during the dynamic mode of operation, to determine whether the measured current differs from an expected current through the resistor leg by more than a designated threshold. In response to the measured current differing from the expected current through the resistor leg by more than the designated threshold, the one or more processors are configured to generate a control signal that increases an engine speed of an engine of the vehicle to above an idle speed of the engine prior to transitioning from the dynamic mode to the propel mode.

BRIEF DESCRIPTION OF THE DRAWINGS

Reference is now made briefly to the accompanying drawings, in which.

DETAILED DESCRIPTION

Figure 1:
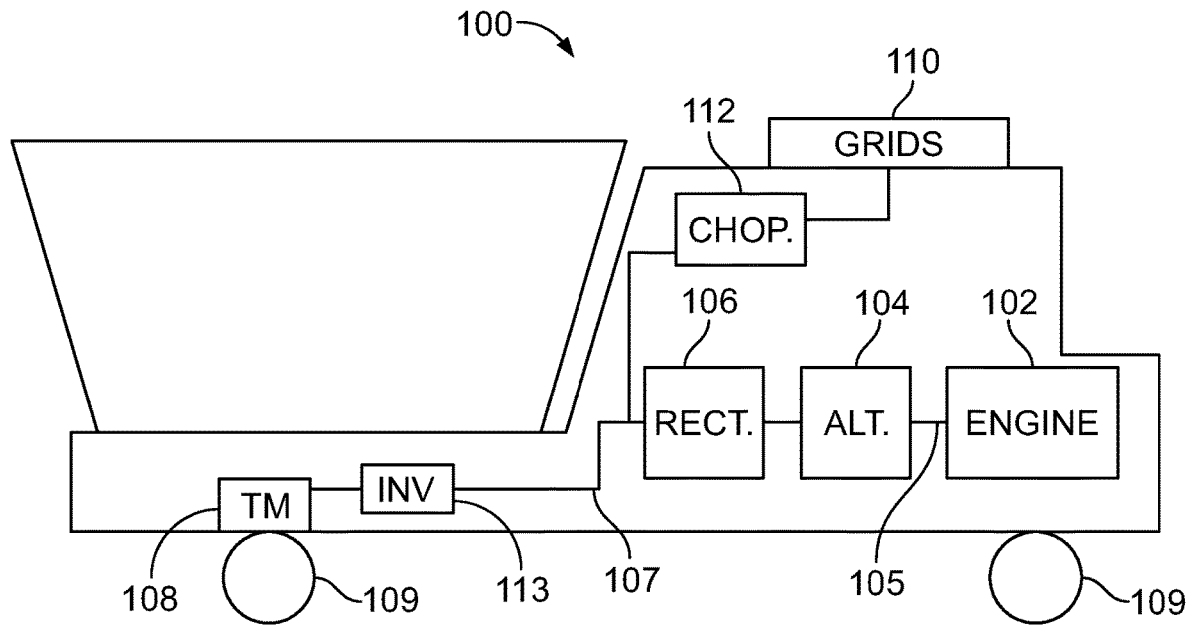
FIG. 1 is a schematic block diagram of a vehicle according to an embodiment of the present disclosure.

Reference will be made below in detail to example embodiments of the inventive subject matter, examples of which are illustrated in the accompanying drawings. Wherever possible, the same reference numerals used throughout the drawings refer to the same or like parts. Certain embodiments of the inventive subject matter are described with respect to off-highway vehicles designed to perform an operation associated with a particular industry, such as mining, construction, farming, etc., and may include haul trucks, cranes, earth moving machines, mining machines, farming equipment, tractors, material handling equipment, earth moving equipment, etc. However, the embodiments of the inventive subject matter are also applicable for use with other vehicles, such as on-road vehicles (e.g., automobiles, tractor-trailer rigs, on-road dump trucks, etc.), rail vehicles, and marine vehicles.

At least one technical effect provided by one or more embodiments described herein is detection of abnormal (e.g., deviating, aberrant, malfunctioning, and/or defective) resistor legs while in a dynamic mode of operation in which traction motors are used for generating electrical energy. The abnormal resistor leg may be caused by a failed (e.g., shorted) braking chopper of the resistor leg, a degraded resistive element of the resistor leg, or the like. For example, a failed braking chopper may be shorted, such that the braking chopper is uncontrollably fixed in a closed or conductive state, or the braking chopper may be uncontrollably fixed in an open or non-conductive state. The abnormal resistor leg can be detected prior to transitioning to a propel mode of operation, in which the traction motors receive power from an engine to mechanically propel the vehicle. By detecting an abnormal resistor leg prior to transitioning to the propel mode, the one or more embodiments described herein are able to take actions to mitigate the risks of engine stalling when engine power is demanded in the propel mode, overheating components, and/or the like. For example, in response to identifying an abnormal resistor leg, the one or more embodiments may control the engine to increase the speed (e.g., revolutions per minute (RPMs)) of the engine prior to transitioning from the dynamic braking mode to the propel mode because the engine may be better able to withstand a power demand without stalling while operating at an increased speed (e.g., relative to the engine speed in the dynamic braking mode).

One or more embodiments may automatically initiate other actions in response to detecting the failed braking chopper in addition to or instead of increasing engine speed, such as alerting an operator, restricting movement of the vehicle, scheduling maintenance, increasing cooling to the resistor leg that is abnormal to reduce the risk of components overheating, or the like. The one or more embodiments described herein may provide periodic, updated conditions of the braking choppers in real time. In response to determining that all braking choppers are properly functioning, the one or more embodiments may reduce the engine speed of the engine to a low idling speed for enhanced fuel efficiency while in the dynamic braking mode without concern of stalling the engine upon transitioning to the propel mode due to the functioning braking choppers.

FIG. 1 is a schematic block diagram of a vehicle 100 according to an embodiment of the present disclosure. The vehicle 100 includes an engine 102 and an alternator 104 that is mechanically coupled to the engine 102 via a shaft 105. The engine 102 of the vehicle 100 may be a diesel engine, a gasoline engine, a multi-fuel engine, or the like. The engine 102 drives the alternator 104 via the shaft 105.

The vehicle 100 in the illustrated embodiment may be an off-highway land-based vehicle 100, such as a mining truck, dump truck, or the like. The embodiments described herein may be applied onboard other types of vehicles, such as other land-based vehicles (e.g., automobiles, busses, semi-trucks, etc.), rail vehicles, marine vessels, and the like.

In one or more embodiments, the vehicle 100 may be a low emissions hybrid or dual energy vehicle. The vehicle 100 may burn fuel, natural gas, and/or another form of energy. The engines of known low emission hybrid vehicles, which target reduced idle speeds to save fuel, may have a propensity for stalling due to problems associated with braking choppers.

The alternator 104 generates electrical energy (e.g., electric current) that is conveyed along a traction bus 107 to various components to power various loads, including propulsion loads for propelling the vehicle 100. The alternator 104 is electrically connected to a rectifier 106. The alternator 104 converts the mechanical energy from the rotating shaft 105 to AC electric current. The rectifier 106 receives the AC electric current from the alternator 104 and converts the AC electric current to DC electric current. The DC output from the rectifier 106 is conveyed along the traction bus 107 to a traction motor 108 that is mechanically coupled to a wheel 109 of the vehicle 100. The traction motor 108 may be an AC motor, and the DC current from the rectifier 106 may be converted to three-phase AC current for the traction motor 108 by an inverter 113. The traction bus 107 may be referred to as a DC link. Alternatively, the traction motor 108 may be a DC motor that is powered by the DC current received from the rectifier 106 without the inverter 113.

The traction motor 108 is electrically connected via the inverter 113, the traction bus 107, and a chopper circuit 112 to resistance grids 110 on the vehicle 100. The chopper circuit 112 includes one or more braking choppers that control the flow of electric current to the resistance grids 110. The resistance grids 110 are configured to dissipate electric current as heat. The vehicle 100 may have more traction motors than the one traction motor 108 shown in FIG. 1.

The vehicle 100 is selectively configurable in different modes including at least a propel mode and a dynamic braking mode. The vehicle 100 operates in the propel mode to generate motive effort to propel the vehicle 100. The vehicle 100 operates in the dynamic baking mode to slow the vehicle 100 by using the rotation of the wheels 109 to generate electrical energy. For example, in the propel mode the traction motor 108 receives electric current that is generated by the alternator 104 which is powered by the engine 102. The traction motor 108 uses the electric current to drive rotation of the wheels 109. During the dynamic mode of operation, the traction motor 108 utilizes the existing rotation of the wheels 109 to generate electrical energy that may be conveyed onto the traction bus 107. Using the traction motor 108 as a generator effectively slows the movement of the vehicle 100. Dynamic braking may be used alone or in combination with friction-based brakes to slow the vehicle 100. The electrical energy generated by the traction motor 108 may be conveyed through the chopper circuit 112 to the resistance grid 110. In an alternative embodiment, the chopper circuit 112 may convey the electrical energy received from the traction motor 108 to a battery or another electrical storage device for future use of the electrical energy.

The resistance grid 110 includes resistive elements that are configured to dissipate electrical current as heat. Although the chopper circuit 112 is shown in FIG. 1 as separate from the resistance grid 110, the chopper circuit 112 may be incorporated within the resistance grid 110 in an alternative embodiment.

In the propel mode, the engine 102 powers the movement of the vehicle 100. In the dynamic braking mode, the engine 102 is not used to propel the vehicle 100. To conserve fuel, the engine 102 may be controlled to reduce the engine speed while in the dynamic breaking mode. For example, the engine speed may be slowed to an idle speed. The idle speed may be designated as a speed that is lower than a typical idle speed in order to improve fuel efficiency while remaining sufficiently high to maintain continuous operation of the engine 102. The vehicle 100 transitions from the dynamic braking mode to the propel mode to accelerate the vehicle 100. The transition to the propel mode may normally be coordinated appropriately so engine speed is adequately staged for desired propel power demand. Additionally, the chopper circuit 112, when properly functioning, may regulate electric current along the traction bus 107 and prevent large power demands on the engine 102 during the transition. However, in a situation in which the braking choppers are degraded or not functioning properly, as regenerative power falls off and the vehicle 100 begins to transition to propulsion using the engine 102, current may still be consumed through the braking grid(s) 110 as result of the degraded braking chopper. In this situation, a large power demand on the engine 102 while the engine 102 is still running at a low idle speed risks causing the engine 102 to stall or bog (and/or the alternator 104 to collapse).

One or more embodiments of the present disclosure are configured to detect a failed braking chopper in the chopper circuit 112 while the vehicle 100 is in the dynamic braking mode. Upon detecting a failed breaking chopper (e.g., a shorted chopper or an open chopper), the one or more embodiments are configured to take remedial action in advance of transitioning to the propel mode. For example, one remedial action may include increasing the engine speed of the engine 102 to a speed greater than the idle speed while in the dynamic braking mode. The engine 102 operating at the greater engine speed may be better able to withstand the power demand at the transition to the propel mode without stalling than the engine 102 operating at the reduced idle speed. The engine speed may be increased to a speed that is sufficiently high to eliminate or at least significantly reduce the risk of engine stall upon switching to the propel mode of operation. In a non-limiting example, the idle speed may be less than 1000 RPMs, such as 500 RPMs, and the engine speed may be increased to an active speed that is sufficient to prohibit engine stall. The active speed may be greater than 1000 RPMs, such as 1500 RPMs, 1700 RPMs, 1900 RPMs, or the like. The active speed that is sufficient to prohibit engine stall may depend on various factors such as the type of engine, the amount of power demanded on the engine, the health of the engine, movement of the vehicle (e.g., speed, etc.), ambient conditions (e.g., temperature, humidity, pressure, etc.), and the like.

A second remedial action that may be automatically taken in addition to, or instead of, increasing the engine speed of the engine 102 may include increasing cooling to the resistance grid 110 to dissipate heat from the resistive elements and other elements thereof. The cooling may be increased by modifying the output of cooling devices that are active, such as blowers, fans, air conditioning units, and/or the like. For example, the output of an active blower may be increased by switching to a higher operating speed (e.g., RPM) to generate a greater flow rate of cooling air. The cooling also may be increased by activating (e.g., turning on) additional cooling devices. For example, three active cooling devices in a given area operating at a designated speed would provide more cooling than two active cooling devices in the given area operating at the designated speed. Activating additional cooling devices may involve activating different types of cooling devices. For example, if one or more blowers are currently operating, a two-stage refrigerant compression cooling system may be activated to provide enhanced cooling that complements that blowers. In another example, the cooling may be increased by operating one or more cooling devices for an extended period of time. For example, instead of turning off or deactivating a blower upon the vehicle transitioning from the regenerative braking mode to the propel mode, the cooling may be increased by maintaining the blower in the active state after the transition such that cooling airflow is provided for a longer period of time. The increased cooling may prevent or at least prohibit the resistive elements and other components of the grid 110 from overheating in response to a shorted braking chopper.

Other remedial actions may be automatically taken in addition to, or instead of, increasing the engine speed of the engine 102 and/or increasing cooling to the resistance grid. For example, movement of the vehicle 100 may be restricted by imposing a speed restriction, imposing an acceleration restriction, imposing an engine speed restriction, and/or the like. Such restrictions may be administered by defining a permitted range of operation below a designated upper limit and/or above a designated lower limit.

Figure 2:
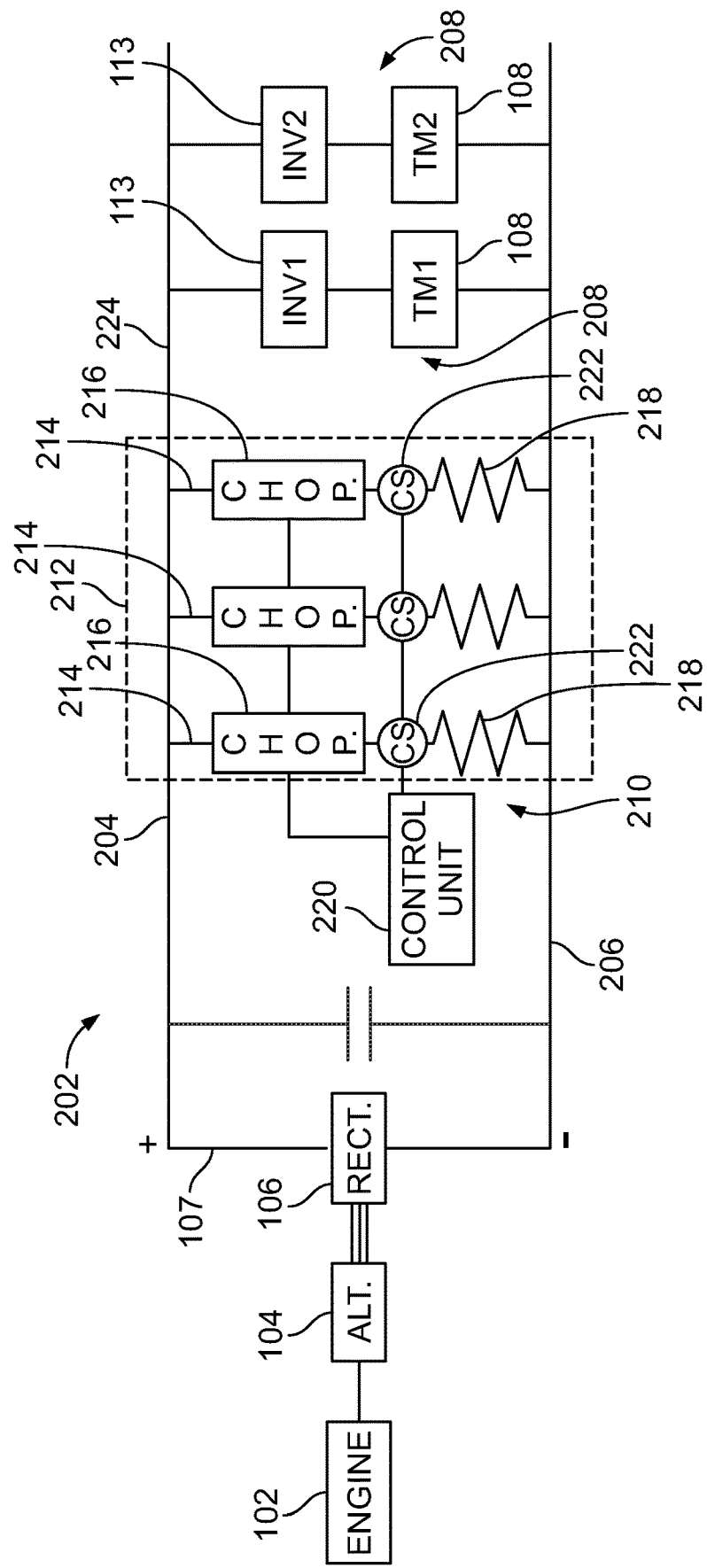
FIG. 2 is a schematic diagram of a traction circuit of the vehicle according to an embodiment.

FIG. 2 is a schematic diagram of a traction circuit 202 of the vehicle 100 according to an embodiment. The traction circuit 202 may be onboard the vehicle 100 shown in FIG. 1. For example, the traction circuit 202 includes the traction bus 107, which has a positive rail 204 and a negative rail 206. The AC current generated by the alternator 104 is converted to DC current by the rectifier 106 and supplied to the positive rail 204 of the traction bus 107. The traction circuit 202 includes two motor subassemblies 208 connected between the positive and negative rails 204, 206. Each motor subassembly 208 includes a respective inverter 113 and traction motor 108. The inverters 113 are labeled as INV1 and INV2 in FIG. 2, and the traction motors 108 are labeled as TM1 and TM2. The two motor subassemblies 208 may be coupled to wheels on the same axle or different axles of the vehicle 100. The traction circuit 202 may have more or less than two motor subassemblies 208 in an alternative embodiment.

The traction circuit 202 also includes a grid box 212 that has at least one resistor leg 214 connected between the positive and negative rails 204, 206 of the traction bus 107.

The grid box 212 has three resistor legs 214 in the illustrated embodiment but may have more or less than three resistor legs 214 in an alternative embodiment. The grid box 212 optionally may be a physical housing structure. The resistor legs 214 are oriented in parallel. The resistor legs 214 are configured to dissipate thermal energy (e.g., heat) that is generated during dynamic braking. Each of the resistor legs 214 includes a respective braking chopper 216 and one or more resistive elements 218 in series with the braking chopper 216. Although not shown, the grid box 212 may also include one or more blowers and/or other cooling devices (e.g., fans, heat sinks, vapor and/or liquid cooling circuits, etc.) for enhancing the dissipation of heat from the grid box 212 to an external environment.

The braking choppers 216 are electronic switching devices that are controlled to switch between open and closed states. In the open state, a braking chopper 216 does not conduct electric current from the positive rail 204 of the traction bus 107 through the respective resistor leg 214. In the closed state, the braking chopper 216 does conduct the electric current from the traction bus 107 through the respective resistor leg 214. When a braking chopper 216 is in the closed state, electric current is conducted along the respective resistor leg 214 and at least some of the electric current is converted to heat that is dissipated from the grid box 212. The braking choppers 216 may include one or more transistors, diodes, inductors, and/or the like. The transistors may include or represent insulated gate bipolar junction transistors (IGBTs), or other types of transistors. The resistive elements 218 are resistors that convert electrical energy into thermal energy. Although shown in FIG. 2 as separate components from the braking choppers 216, it is recognized that the resistive elements 218 may represent integral components of the braking choppers 216.

The braking choppers 216 are controlled by a control unit 220. The control unit 220 includes or represents one or more processors. The control unit 220 may be embodied in a computer, computer processor, microprocessor, micro-controller, or other logic-based circuit device, that operates based on one or more sets of instructions (e.g., software) stored on a tangible and non-transitory computer readable storage medium. The computer readable storage medium may include or represent a hard drive, a flash drive, ROM, RAM, or the like. The control unit 220 may include the one or more processors and associated circuitry. The control unit 220 can control when the braking choppers 216 are open and closed to control when the braking choppers 216 prevent or allow current to be conveyed through the resistor legs 214. For example, the control unit 220 can transmit a control signal that applies a voltage to a gate of a braking chopper 216 to switch the transistor of the braking chopper 216 to a conducting state in order to turn the braking chopper 216 to the closed, conducting state. The control unit 220 can switch the braking chopper 216 from the closed, conducting state to the open, non-conducting state by ceasing to transmit this control signal or by transmitting a different control signal to the gate in order to switch the transistor of the braking chopper 216 to a blocking state.

The control unit 220 may control the braking choppers 216 to alternate between the open (e.g., blocking) state and the closed (e.g., conducting) state according to duty cycles. The duty cycles represent the durations that the braking choppers 216 remain in a designated state before switching states, as well as the frequency or timing of the switches between states. The control unit 220 may independently control the different braking choppers 216 according to different corresponding duty cycles such that not all of the braking choppers 216 are in a given state at the same time and not all of the braking choppers 216 switch between states at the same moment. For example, the control unit 220 can switch one braking chopper 216 from the closed state to the open state at a given instant, while maintaining another braking chopper 216 in the closed state for a designated amount of time after the given instant before switching the open state. Thus, the braking choppers 216 may be controlled according to different duty cycles. The control unit 220 may control the braking choppers 216 according to different duty cycles in order to regulate the electrical energy along the traction bus 107 that is generated by the traction motors 108 during dynamic braking.

In the illustrated embodiment, each of the resistor legs 214 is associated with a corresponding current sensor 222 that is configured to monitor the electric current through the respective resistor leg 214. When the braking chopper 216 of a respective resistor leg 214 is in the open state, a measured current through the resistor leg 214 by the current sensor 222 may be approximately zero amperes (e.g., there may be some noise that prevents a measured current of exactly zero amperes). When the braking chopper 216 is in the closed state, the current sensor 222 may measure a non-zero current through the resistor leg 214. The current sensors 222 are communicatively connected to the control unit 220. For example, the current sensors 222 may be conductively connected to the control unit 220 via one or more wired connections or may be wirelessly connected to the control unit 220. FIG. 2 shows three current sensors 222 that are associated with the three corresponding resistor legs 214. In an alternative embodiment, the grid box 212 may include only a single current sensor 222 that is configured to monitor a total current through the grid box 212. For example, the current measured by the current sensor 222 in this alternative embodiment represents a sum of the current through the individual resistor legs 214.

In one or more embodiments, the control unit 220, the resistor legs 214, and the current sensors 222 represent components of a control system 210 for controlling the movement of the vehicle 100 (shown in FIG. 1) along the terrain, or at least the engine 102 thereof. The control system 210 is configured to detect a failed braking chopper 216 and initiate remedial action to prevent (or at least prohibit) interference with the operation of the engine 102 and alternator 104. For example, the engine 102 and alternator 104 provide power to various components and systems on the vehicle 100 (shown in FIG. 1), such as braking systems, propulsion systems, electronic systems, lighting systems, HVAC systems, communication systems, and the like. As described herein, the control system 210 may be able to detect a failed braking chopper 216 while the vehicle 100 is in the dynamic braking mode, and may take remedial actions to prevent (or at least prohibit) the engine 102 from stalling (and/or the alternator 104 from collapsing) when transitioning to the propel mode in which power from the engine 102 and alternator 104 is demanded for powering the traction motors 108.

In at least one embodiment, the control unit 220 is configured to detect a failed braking chopper 216 based on current measurements received from the current sensors 222. For example, the control unit 220 may receive data signals from each of the current sensors 222 via wired or wireless communication pathways. The data signal represents a measured current through the corresponding resistor leg 214 monitored by the respective current sensor 222 that generated the data signal. The measured current from the current sensors 222 represents an actual current value. The control unit 220 is configured to compare the measured current received from a current sensor 222 to an expected current through the resistor leg 214 monitored by the current sensor 222. The expected current is calculated, as described below. In at least one embodiment, if the control unit 220 determines that the measured current deviates or differs from the expected current by more than a designated threshold, the control unit 220 identifies the respective resistor leg 214 as abnormal or malfunctioning. For example, the resistor leg 214 may be abnormal due to a failed braking chopper 216 and/or a degraded resistive element 218. In response to identifying an abnormal resistor leg 214, the control unit 220 is configured to generate a control signal that commands increasing an engine speed of the engine 102 or one or more other remedial actions, such as increasing cooling to the abnormal resistor leg 214, restricting movement of the vehicle 100, notifying an operator, scheduling maintenance, and/or the like. The control signal may dictate increasing the engine speed while the vehicle 100 is still in the dynamic braking mode (e.g., before power is demanded of the engine 102 in the propel mode).

The following example describes how the control unit 220 may detect a failed braking chopper 216 of one of the resistor legs 214 in the grid box 212. The control unit 220 calculates the expected current through the resistor leg 214 using Ohm's Law (e.g., I=V/R), by dividing a link voltage along the traction bus 107 by an expected effective resistance along the resistor leg 214. The link voltage is a voltage at a DC link 224 of the traction bus 107 between the traction motors 108 and the resistor leg 214. The link voltage may vary during operation, such that the link voltage may increase during dynamic braking as electric current is supplied onto the traction bus 107 by the traction motors 108. The link voltage may be measured by a voltage sensor (not shown) that is communicatively connected to the control unit 220.

The expected effective resistance along the resistor leg 214 is dependent on the resistive elements 218 and the duty cycle of the braking chopper 216. For example, the one or more resistive elements 218 on the resistor leg 214 have a nominal resistance that represents the resistance through the resistor leg 214 when current is continuously conducted through the resistor leg 214. Since the braking chopper 216 is operated according to a duty cycle that switches the braking chopper 216 to an open, blocking state for a proportion of the time, the effective resistance may differ from the nominal resistance. The effective resistance increases with increasing amount of time that the braking chopper 216 is in the open, blocking state because the resistance in the open state is very high (e.g., the circuit is open). The duty cycle includes a commanded chopper percent value, which represents the percentage of time that the braking chopper 216 is controlled by the control unit 220 to be in the closed, conducting state to conduct electric current from the traction bus 107 through the braking chopper 216 to the one or more resistive elements 218. For example, a commanded chopper percent value of 50% indicates that, in a 100 second time period, the control unit 220 controls the braking chopper 216 to be in the closed, conducting state for 50 seconds, and to be in the open, blocking state for 50 seconds. Different duty cycles have different commanded chopper percent values.

To calculate the expected effective resistance, the nominal resistance is divided by the commanded chopper percent value (e.g., $R_{eff}=R_{nom}/\%_{CC}$). For example, if the nominal resistance of a resistor leg 214 is 100 Ohms and the commanded chopper percent value is 50%, then the calculated expected effective resistance is 200 Ohms (e.g., 100 Ohms/0.5). In another example, if the nominal resistance is 100 Ohms and the commanded chopper percent value is 25%, then the calculated expected effective resistance for the resistor leg 214 is 400 Ohms. The expected effective resistance increases with increasing amount of time in the open, blocking state according to the duty cycle.

The expected effective resistance is referred to as an "expected" value because this value is based on proper functioning of the braking chopper 216. For example, although the braking chopper 216 may be controlled to be in the closed, conducting state for 50% of the time according to a designated duty cycle, if the braking chopper 216 is abnormal the braking chopper 216 does not function as requested. For example, if the braking chopper 216 is shorted, the braking chopper 216 may remain in the closed, conducting state without switching to the open, blocking state when commanded. Furthermore, if the braking chopper 216 fails in the open state, the braking chopper 216 does not allow current through the resistor leg 214, even when commanded to do so. Therefore, the expected effective resistance value is based on how the braking chopper 216 is commanded to function, and may differ from the actual effective resistance in the resistor leg 214 if the braking chopper 216 is abnormal.

The control unit 220 is configured to calculate the expected current through the resistor leg 214 by dividing the link voltage by the expected effective resistance along the resistor leg 214 according to Ohm's Law. The control unit 220 then compares the expected current to the measured current received from the current sensor 222 associated with the resistor leg 214. If the calculated expected current differs from the measured current by more than a designated threshold, the control unit 220 detects that the braking chopper 216 is abnormal. The designated threshold may vary depending on the operational state of the vehicle 100 (FIG. 1). For example, the control unit 220 may utilize a different designated threshold when the vehicle 100 is in the propel mode of operation than for when the vehicle 100 is in the dynamic braking mode. The designated threshold may be set by an operator or via regulation. The designated threshold according to a non-limiting example may be a set percentage range, such as within 5%, within 10%, or within 15%. For example, if the designated threshold is 10% and the expected current is 7% off from the measured current, then the expected current may be determined to be within the designated threshold, indicating that the braking chopper 216 is properly functioning. But, if the expected current is 13% off from the measured current, then the expected current may be determined to be outside of the designated threshold, indicating that the braking chopper 216 is abnormal or has failed.

The control unit 220 may be configured to perform the same calculations described above on each of the resistor legs 214 of the grid box 212 to detect if any of the braking choppers 216 are abnormal. For example, the control unit 220 receives measured currents from each of the current sensors 222 on the resistor legs 214, and compares the measured currents to expected currents through the resistor legs 214. The expected currents are based on the corresponding nominal resistances of the resistor legs 214 and the duty cycles (e.g., the commanded chopper percent values) of the braking choppers 216.

In the alternative embodiment in which only a single current sensor 222 is installed on the grid box 212. The control unit 220 is configured to determine if at least one of the braking choppers 216 is abnormal by aggregating the expected currents through the resistor legs 214 and comparing the aggregated expected currents to the measured current by the single current sensor 222.

In at least one embodiment, if at least one of the braking choppers 216 is determined to be abnormal, then the control unit 220 is configured to automatically initiate remedial actions according to programmed instructions. For example, if the engine 102 is currently idling while in the dynamic braking mode, the control unit 220 may generate a control signal that commands increasing the engine speed of the engine 102 to a speed greater than the idle speed of the engine 102. The control unit 220 may transmit the control signal to the engine 102 (or to an engine controller device) via a wired or wireless communication pathway. The control signal may designate engine settings, such as a specific engine speed to attain, a time at which to initiate the engine speed increase (e.g., immediately or at a future time), a rate at which to increase the engine speed, and/or the like. Optionally, the control unit 220 may generate additional control signals in response to detecting that an abnormal braking chopper 216, including alerting an operator, logging an incident report, imposing a speed restriction on the vehicle 100 or otherwise restricting movement of the vehicle, increasing cooling to the abnormal resistor leg 214 or all of the resistor legs 214, imposing other power restrictions on the vehicle 100, scheduling maintenance for the abnormal resistor leg 214, and/or the like.

Figure 3:
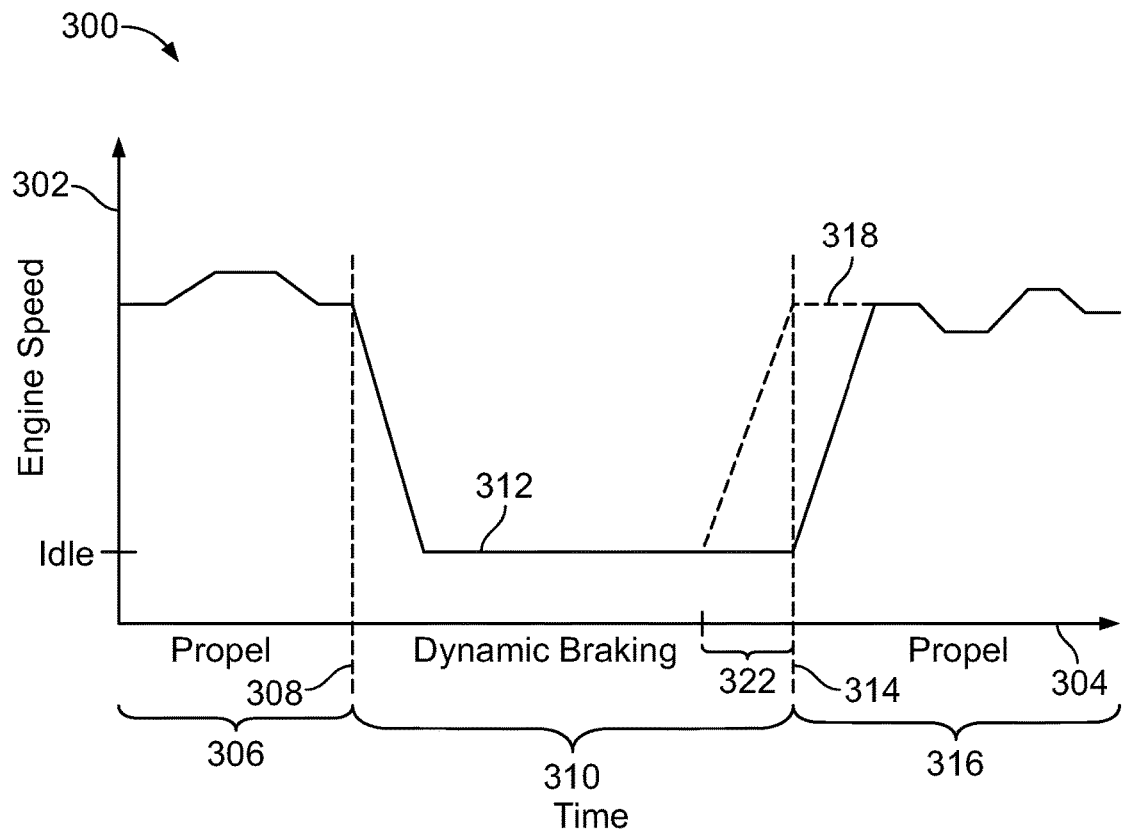
FIG. 3 is a graph illustrating engine speed of an engine of the vehicle over time according to an embodiment.

FIG. 3 is a graph 300 illustrating engine speed of the engine 102 of the vehicle 100 (shown in FIG. 1) over time according to an embodiment. The y-axis 302 represents engine speed, and the x-axis 304 represents time. The time period illustrated in the graph 300 represents a time period in which the vehicle 100 is operating, such as driving along terrain. During the time period, the vehicle 100 alternates between operating in the propel mode and operating in the dynamic braking mode.

In FIG. 3, during a first time interval 306, the vehicle 100 operates in the propel mode, such that the engine 102 (FIG. 2) powers the traction motors 108 (FIG. 2) to propel the vehicle 100. The engine speed of the engine 102 may vary or fluctuate while in the propel mode based on throttle and braking settings applied by an operator. For example, the engine speed may increase in response to a demand for additional power to accelerate the vehicle 100, and the engine speed may decrease in the absence of a demand for additional power. At a first transition time 308, the vehicle 100 switches from the propel mode to the dynamic braking mode, and the vehicle 100 travels in the dynamic braking mode during a second time interval 310. At the first transition time 308, the engine speed starts to decrease. The engine speed decreases during the second time interval 310 until the engine speed attains a designated idle speed 312. The designated idle speed 312 may be selected in order to conserve fuel while maintaining continuous operation of the engine 102. The idle speed 312 may be lower than some known idle speeds of other vehicles in order to provide greater fuel efficiency when in the dynamic braking mode than the fuel efficiency provided by the known vehicles.

In an embodiment, the control unit 220 (FIG. 2) of the control system 210 is configured to run in real-time by periodically detecting whether any of the braking choppers 216 (FIG. 2) are abnormal. For example, the control unit 220 may make an updated determination of whether any of the braking choppers 216 are abnormal at a designated time interval, such as once every minute, once every thirty seconds, once every ten seconds, once every three seconds, or the like. The control unit 220 is configured to perform such a braking chopper failure determination while the vehicle 100 is in the dynamic braking mode, and optionally may also perform the determination while the vehicle 100 is in the propel mode. Therefore, during the second time interval 310 while the vehicle 100 is in the dynamic braking mode, the control unit 220 performs the braking chopper failure determination one or more times to detect any failed braking choppers 216.

If the results of the braking chopper failure determination indicate that all braking choppers 216 are properly functioning, then the engine speed remains at the idle speed 312 until a second transition time 314 in which the vehicle 100 transitions back to the propel mode for a third time interval 316. After the second transition time 314, the engine speed of the engine 102 is controlled to increase in order to handle a power demand on the engine 102 for powering the traction motors 108. The engine speed increases to an active speed or range of speeds of the engine attributable with propulsion of the vehicle 100.

If, on the other hand, the control unit 220 during the braking chopper failure determination detects that at least one of the braking choppers 216 are abnormal, such as shorted (e.g., permanently in the closed, conducting state) or open (e.g., permanently in the open, blocking state), then the control unit 220 may modify the engine speed of the engine 102. For example, the control unit 220 may control the engine 102 to increase the engine speed from the idle speed 312 while still in the dynamic braking mode during the second time interval 310, prior to the second transition time 314 and the propel mode that follows. As a result, the engine speed may be at an active speed 318 at the second transition time 314, as opposed to the idle speed 312 at the second transition time 314. The active speed 318 is greater than the idle speed 312, so the engine 102 may be better able to withstand a large power demand on the engine 102 without stalling due to the presence of at least one failed braking chopper 216.

The vehicle 100 may be coasting or braking during the second time interval 310 in the dynamic braking mode. For example, the vehicle 100 may be traveling along a downhill grade during the second time interval 310. In response to detecting at least one failed braking chopper 216, the engine speed is increased while still in the dynamic braking mode. For example, the control unit 220 may increase the engine speed as the vehicle 100 continues to travel along a downhill grade while the engine 102 is not used to power movement of the vehicle 100, which may seem counterintuitive. The increased engine speed is deliberate to enable the engine 102 to handle a power demand upon entering the propel mode without stalling. It is recognized that increasing the engine speed for the time period 322 at the end of the dynamic braking mode may reduce fuel efficiency, but the reduction in fuel efficiency only occurs in a failure mitigation mode when at least one of the braking choppers 216 has failed. In the failure mitigation mode, the reduced fuel efficiency may be preferable over the engine 102 stalling.

Figure 4:
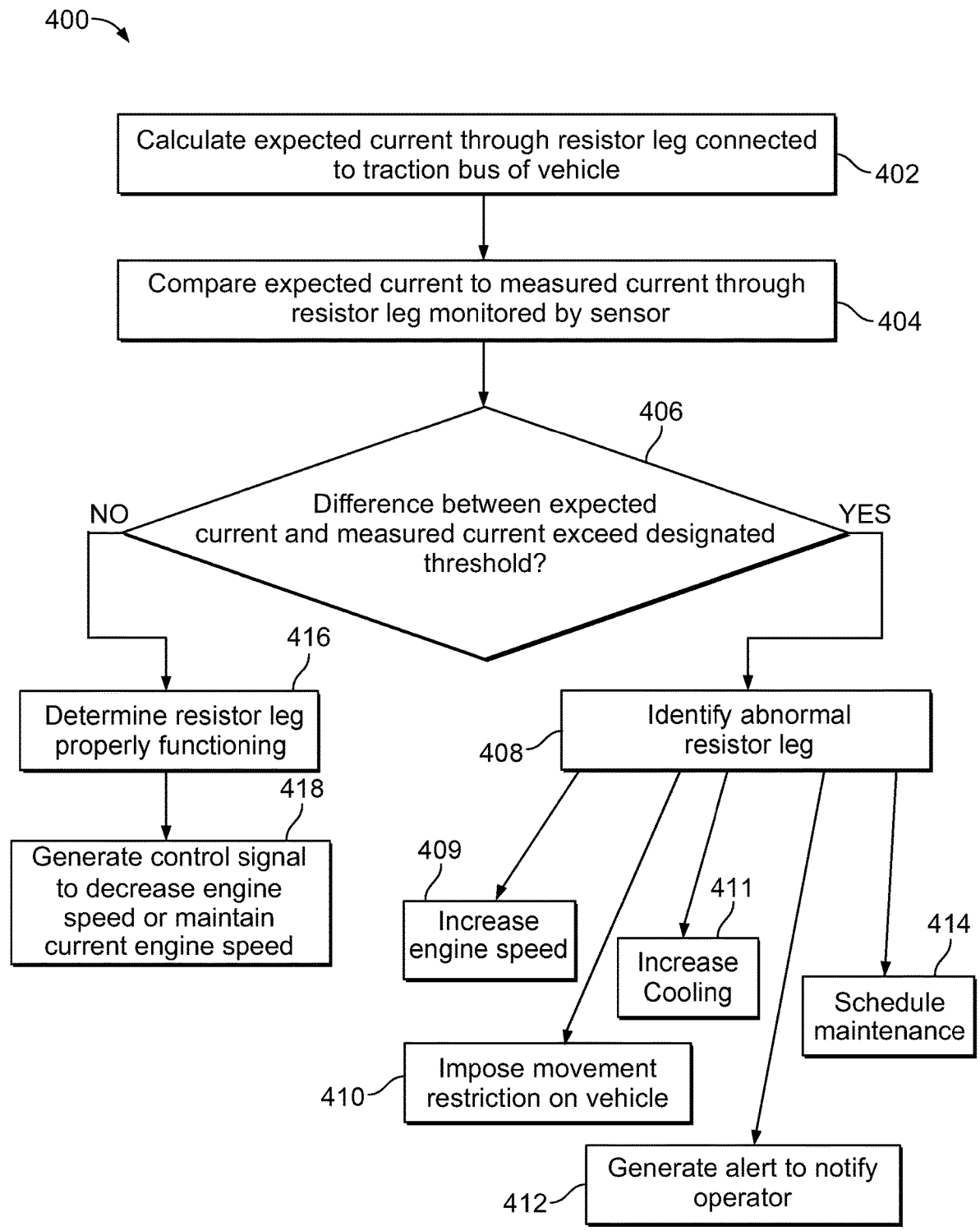
FIG. 4 is a flow chart of a method for controlling a vehicle according to an embodiment.

FIG. 4 is a flow chart of a method 400 for controlling a vehicle according to an embodiment. The method 400 may be a method for detecting a failed braking chopper and controlling a vehicle to eliminate or substantially reduce the risk of engine stall upon transitioning from a dynamic mode of operation to a propel mode of operation in the presence of the failed braking chopper. With reference also to FIGS. 1-3, the method 400 begins at 402, at which an expected current through a resistor leg 214 connected to a traction bus 107 of a vehicle 100 is calculated. The resistor leg 214 includes a braking chopper 216 and one or more resistive elements 218. The resistor leg 214 may be one of multiple resistor legs 214 within a grid box 212 onboard the vehicle 100 configured to dissipate energy generated during dynamic braking as heat.

The expected current is calculated based on a link voltage and a duty cycle of the braking chopper 216. The expected current through the resistor leg 214 may be calculated by dividing the link voltage by an expected effective resistance of the resistor leg 214. The expected effective resistance is based on the duty cycle of the braking chopper 216 and a known nominal resistance of the resistor leg 214. For example, the method 400 may include calculating the expected effective resistance, and using the expected effective resistance to calculate the expected current through the resistor leg 214. The expected effective resistance may be calculated by dividing the known nominal resistance of the resistor leg 214 by a commanded chopper percent value according to the duty cycle. The commanded chopper percent value represents a percentage of time that the braking chopper 216 is commanded by the control unit 220 to be in a closed state to conduct electric current from the traction bus 107 through the braking chopper 216 to the one or more resistive elements 218.

At 404, the expected current through the resistor leg 214 is compared to a measured current through the resistor leg 214 as monitored by a current sensor 222. At 406, it is determined whether a difference between the expected current and the measured current exceeds a designated threshold.

If the difference does exceed the designated threshold, then flow proceeds to 408 and at least one of the resistor legs 214 is identified as abnormal. With one or more abnormal resistor legs 214 (which may be attributable to a failed braking chopper 216 and/or a degraded resistive element 218), there is a risk of stalling the engine 102 with a large power demand on the engine 102. There may also be a risk of fire, damaged components, or the like caused by overheating.

At 409, in response to identifying the abnormal resistor leg(s) 214, a control signal may be generated to increase an engine speed of the engine 102 of the vehicle 100 to prohibit engine stall. The engine speed may be increased prior to the vehicle 100 transitioning from a dynamic braking mode to a propel mode. In the propel mode, power supplied by the engine 102 is used to propel the vehicle 100. In the dynamic braking mode, electrical energy is generated by traction motors 108 coupled to the wheels 109 of the vehicle 100, and the engine 102 is not used to generate power for propulsion. The control signal may command increasing the engine speed from an idle speed to an active speed that is greater than the idle speed. The engine 102 operating at the active speed may be better able to withstand a significant power demand on the engine 102 without stalling than the engine 102 operating at the idle speed.

The method 400 may include automatically taking other remedial actions upon detecting one or more abnormal resistor legs 214 instead of, or in addition to, increasing the engine speed. For example, at 410, a movement restriction is imposed on the vehicle 100. The movement restriction may be a speed restriction. For example, a control signal generated by the control unit 220 may establish an upper speed limit, prohibiting the vehicle 100 from traveling at speeds greater than the upper speed limit until the abnormal resistor leg 214 (e.g., failed braking chopper 216 thereof) has been fixed. Optionally, the movement of the vehicle 100 may be restricted by imposing an acceleration restriction, an engine speed restriction, a power output restriction, and/or the like. At 411, cooling for the one or more abnormal resistor legs 214 (and/or the resistance grid in general) is increased. For example, an operational speed of one or more active cooling devices, such as blowers, may be increased, a number of active cooling devices may be increased, a period of operation of the active cooling devices may be increased, and/or the like to dissipate more heat in an attempt to prevent damage due to overheating. At 412, an alert is generated to notify an operator that one or more of the braking choppers 216 have failed. The alert may be an audible noise, a text-based message on a computing device screen, one or more flashing lights, and/or the like. At 414, maintenance is scheduled for repairing the resistor leg 214 that has the failed braking chopper 216. Although not shown, additional remedial actions may be taken by the control unit 220, including automatically logging an incident report, communicating a message to another vehicle or a remote dispatch location, and the like.

Referring now back to 406, if the difference between the expected current and the measured current does not exceed the designated threshold, the method 400 proceeds to 416 and it is determined that the resistor legs 214 are all properly functioning. Optionally, the method 400 may continue to 418 at which a control signal is generated to reduce the engine speed of the engine 102 or to maintain the engine speed at a current (e.g., existing) speed. The engine speed may be reduced to (or maintained at) a low idle speed during the dynamic braking mode in order to provide increased fuel efficiency versus operating the engine speed at greater speeds during the dynamic braking mode. Upon determining that the resistor legs 214 are all properly functioning, there may be little or no concern of engine stall upon transitioning to the propel mode because the functioning braking choppers 216 regulate the electrical energy along the traction bus 107 and prohibit a large power demand on the engine 102.

The method 400 optionally may repeat periodically in real time during operation of the vehicle 100. For example, updated values of the measured current through the resistor leg 214 may be periodically received by the control unit 220 from the current sensor 222. The control unit 220 may be configured to repeat the method 400 in response to receiving the updated value of the measured current. For example, the control unit 220 may calculate an updated expected current through the resistor leg 214 at 402 and compare the updated expected current to the updated value of the measured current at 404. Thus, the method 400 may be performed in real time to provide advance detection of failed braking choppers 216 while in the dynamic braking mode, prior to transitioning to the propel mode.

The method 400 may be active (e.g., repeatably and/or continuously performed) to detect failed braking choppers 216 during operation of the vehicle 100 even while not in the dynamic braking mode. For example, the method 400 may be performed during all operational modes of the vehicle 100, such as while the vehicle 100 is in the propel mode, the dynamic braking mode, and any other operational modes. During the propel mode, the expected current through the resistor leg 214 at 402 would be 0 A (or a non-zero amount within a designated noise range of 0 A) because no current is expected through the resistor leg 214 while in the propel mode. The designated threshold at 406 while the vehicle 100 is in the propel mode of operation may be the same or different than the designated threshold while the vehicle 100 is in the dynamic mode. If the difference between the expected current and the measured current exceeds the designated threshold, then the method 400 may determine that at least one of the braking choppers 216 has failed and may automatically take appropriate remedial actions. The appropriate remedial actions to a detected failed braking chopper 216 while in the propel mode of operation may include the actions shown in steps 410, 411, 412, and 414. Thus, in one embodiment, the method 400 and control system 210 may be active during all modes of operation of the vehicle 100.

In an alternative embodiment, the method 400 and control system 210 may be active only when the vehicle 100 is in the dynamic braking mode. For example, the transition to the dynamic braking mode may trigger activation of the method 400 and control system 210 to begin detecting for failed braking choppers 216.

The method 400 described above can identify abnormal resistor legs 214 by detecting failed braking choppers 216 and/or by detecting other abnormal components in the grid box 212, such as degraded resistive elements (e.g., resistors) 218 on the resistor legs 214. For example, grid resistors in the grid (representing the resistive elements 218) can gradually degrade over time as resistance falls out of tolerance due to partial shorts in grid plates or the like. A degraded (e.g., failed or partially failed) grid resistor could cause secondary damage to a braking chopper 216 if the grid box 212 is not serviced and inspected. Thus, detecting the degraded resistor before the resistor falls significantly out of tolerance may help prevent a subsequent chopper 216 failure.

In order to detect a degraded grid resistor (e.g., resistive element 218), the decision step at 406 may be split into multiple different decisions using different designated thresholds. The method 400 at step 406 may have a first designated threshold and a second designated threshold, where the first threshold is less than the second threshold. In a non-limiting example, the first threshold may be 3%, and the second threshold may be 10%. If the difference between the expected current through the resistor leg 214 and the measured current is less than both thresholds (e.g., is less than or equal to 3%), then the resistor leg 214 is determined to be properly functioning. If, on the other hand, the difference between the expected and measured currents is greater than the first threshold but less than the second threshold (e.g., greater than 3% but less than or equal to 10%), then the resistor leg 214 may be determined to have a degraded resistor. Finally, if the difference between the expected and measured currents is greater than the second threshold (e.g., greater than 10%), then the resistor leg 214 may be determined to have a failed braking chopper 216. Therefore, a failed braking chopper 216 may cause a more significant deviation between the expected and measured currents than a degraded resistor. Relatively small discrepancies that exceed a noise or error threshold may indicate a partially degraded resistor, while larger discrepancies may indicate a failed chopper 216 (and/or possibly a completely failed resistor). In response to detecting a partially degraded resistor (but not a failed chopper 216), the method 400 may automatically take one or more remedial actions, such as increasing the engine speed at 409, imposing a movement restriction on the vehicle at 410, increasing cooling at 411, generating an alert to notify an operator at 412, and/or scheduling maintenance at 414.

In at least one embodiment, a system and method for detecting a failed braking chopper are provided. The failed braking chopper may refer to a shorted or open chopper. The system and method ensure engine stability in systems that include reduced engine idle speeds for fuel saving benefits during dynamic or regenerative braking operations.

To save fuel while the engine is idling during dynamic braking operation, the engine speed may be reduced because engine power is not needed. In the dynamic braking mode, the alternator rectifier is back biased to a three-phase voltage set-point that is lower than the link voltage regulated via braking choppers on the traction bus, which keeps the link "off" the alternator. Chopper regulation adjusts the effective grid resistance across the DC link to maintain the link at a desired link voltage set-point. The alternator is poised for holding the link up once the link voltage drops to the alternator idle set-point. The engine and alternator at their respective idle set-points are not designed to handle a significant power demand, and such a power demand while operating at the low idle set-points may cause the alternator to collapse and/or the engine to stall. Engine stall is undesirable because various vehicle systems, such as hydraulic loads of braking and steering the vehicle, rely on the functioning engine. Therefore, the ability to provide early detection of a failed braking chopper may significantly reduce the risk of engine stall and improve vehicle operation.

The embodiments of the system and method described herein are able to detect abnormal resistor legs, which include failed (e.g., shorted or stuck open) braking choppers and/or degraded grid resistors, while the vehicle is in the dynamic braking mode. For example, the system and method allow advanced warning of abnormal resistor legs prior to a power demand being applied on the alternator and engine in the propel mode. The system and method may alert a drive system controller of an abnormal resistor leg. Upon detecting a failed chopper, the system and method may control the engine to increase the engine speed proactively and early enough to maintain engine stability and prevent engine stall and/or alternator collapse. The system and method may allow for increased fuel efficiency while in the dynamic braking mode by allowing engine speed reduction and mitigating the risk of engine stall due to an abnormal resistor leg.

In an embodiment, a control system includes a current sensor and one or more processors. The current sensor is configured to be disposed onboard a vehicle and to monitor a measured current conducted into a resistor leg of the vehicle. The resistor leg has a braking chopper and one or more resistive elements. The resistor leg is connected with a traction bus of the vehicle. The one or more processors are communicatively connected to the current sensor. The one or more processors are configured to receive the measured current from the current sensor and, in response to the measured current differing from an expected current through the resistor leg, the one or more processors are configured to generate a control signal configured to one or more of increase an engine speed of an engine of the vehicle, increase cooling to the one or more resistive elements of the resistor leg, restrict movement of the vehicle, or schedule maintenance for the resistor leg.

Optionally, the control signal is configured to increase the engine speed to a speed sufficient to prohibit engine stall.

Optionally, the control signal is configured to increase the engine speed of the engine while the vehicle travels in a dynamic braking mode prior to the vehicle transitioning from the dynamic braking mode to a propel mode in which power supplied by the engine is used to propel the vehicle.

Optionally, the one or more processors are configured to calculate the expected current through the resistor leg based on a link voltage along the traction bus and a duty cycle of the braking chopper. Optionally, the one or more processors are configured to calculate the expected current through the resistor leg by dividing the link voltage by an expected effective resistance of the resistor leg. The expected effective resistance is based on the duty cycle of the braking chopper.

Optionally, the one or more processors are configured to generate the control signal in response to the measured current differing from the expected current through the resistor leg by more than a designated threshold. The designated threshold is a non-zero threshold.

Optionally, the traction bus electrically connects an alternator to one or more traction motors on the vehicle. The alternator is mechanically coupled to the engine via a shaft.

Optionally, responsive to the measured current differing from the expected current, the one or more processors are configured to generate an alert to notify an operator that the resistor leg is abnormal.

Optionally, in response to the measured current not differing from the expected current, the one or more processors are configured to generate a control signal configured to decrease the engine speed of the engine or maintain the engine speed of the engine at a current speed.

Optionally, the vehicle is an off-highway land-based vehicle.

Optionally, the vehicle is a hybrid vehicle.

Optionally, the resistor leg is a first resistor leg of multiple resistor legs disposed within a grid box onboard the vehicle. Each of the resistor legs includes a respective braking chopper. The current sensor that monitors the first resistor leg is a first current sensor of multiple current sensors that are each configured to monitor a different corresponding one of the resistor legs in the grid box. The one or more processors are communicatively connected to the multiple current sensors. The one or more processors are configured to receive respective measured currents from the current sensors and to generate the control signal in response to any of the measured currents differing from respective expected currents through the resistor legs.

Optionally, the control signal is configured to increase the engine speed of the engine from an idle speed to an active speed.

In an embodiment, a method (e.g., for controlling a vehicle) includes calculating an expected current through a resistor leg electrically connected to a traction bus on a vehicle. The resistor leg includes a braking chopper. The method includes comparing the expected current through the resistor leg to a measured current through the resistor leg. The measured current is generated by a current sensor. In response to a difference between the expected current and the measured current exceeding a designated threshold, the method also includes generating, via one or more processors, a control signal configured to one or more of increase an engine speed of an engine of the vehicle, increase cooling to the one or more resistive elements of the resistor leg, restrict movement of the vehicle, or schedule maintenance for the resistor leg.

Optionally, the expected current is calculated based on a link voltage and a duty cycle of the braking chopper.

Optionally, the control signal is configured to increase the engine speed of the engine from an idle speed to an active speed prior to the vehicle transitioning from a dynamic braking mode to a propel mode in which power supplied by the engine is used to propel the vehicle.

Optionally, responsive to determining the difference exceeding the designated threshold, the method includes generating an alert to notify an operator that the resistor leg is abnormal.

Optionally, the method further includes calculating the expected effective resistance by dividing a known nominal resistance of the resistor leg by a commanded chopper percent value according to the duty cycle. The commanded chopper percent value represents a percentage of time that the braking chopper is commanded by a control unit to be in a closed state to conduct electric current from the traction bus through the braking chopper to one or more resistive elements.

In an embodiment, a control system includes a current sensor and one or more processors. The current sensor is configured to be disposed onboard a vehicle and to monitor a measured current conducted into a resistor leg of the vehicle. The resistor leg has a braking chopper and one or more resistive elements. The resistor leg is connected with a traction bus of the vehicle. The one or more processors are communicatively connected to the current sensor. The one or more processors are configured to control one or both of the braking choppers or a traction motor of the vehicle in both a dynamic mode of operation where electricity is generated by the traction motor and in a propel mode of operation where electricity is provided to the traction motor to move the vehicle. The one or more processors are configured to receive the measured current from the current sensor, and, during the dynamic mode of operation, to determine whether the measured current differs from an expected current through the resistor leg by more than a designated threshold. In response to the measured current differing from the expected current through the resistor leg by more than the designated threshold, the one or more processors are configured to generate a control signal that increases an engine speed of an engine of the vehicle to above an idle speed of the engine prior to transitioning from the dynamic mode to the propel mode.

Optionally, the control signal is a first control signal and the one or more processors are further configured to generate a second control signal that increases cooling to the one or more resistive elements of the resistor leg.

The above written description uses examples to disclose several embodiments of the inventive subject matter, including the best mode, and also to enable one of ordinary skill in the art to practice the embodiments of inventive subject matter, including making and using any devices or systems and performing any incorporated methods. The written description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments may be apparent to those of ordinary skill in the art upon reviewing the above description. The scope of the inventive subject matter should, therefore, be determined with reference to the appended claims, along with the full scope of equivalents to which such claims are entitled.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A control system comprising:
    a current sensor configured to be disposed onboard a vehicle and to monitor a measured current conducted through a resistor leg of the vehicle, the resistor leg having a braking chopper and one or more resistive elements, the resistor leg electrically connected to a traction bus of the vehicle; and
    one or more processors communicatively connected to the current sensor, and configured to receive the measured current from the current sensor, the one or more processors configured to determine that the measured current differs from an expected current through the resistor leg, and, in response, generate a control signal configured to increase an engine speed of an engine of the vehicle.

2. The control system of claim 1, wherein the one or more processors are configured to determine that the measured current differs from the expected current during a dynamic braking mode of operation of the vehicle in which electrical energy is generated by a traction motor of the vehicle, and the control signal is configured to increase the engine speed of the engine prior to the vehicle transitioning from the dynamic braking mode of operation to a propel mode of operation in which power is supplied by the engine to the traction motor to propel the vehicle.

3. The control system of claim 1, wherein the one or more processors are configured to calculate the expected current through the resistor leg based on a link voltage along the traction bus and a duty cycle of the braking chopper.

4. The control system of claim 3, wherein the one or more processors are configured to calculate the expected current through the resistor leg by dividing the link voltage by an expected effective resistance of the resistor leg, the expected effective resistance based on the duty cycle of the braking chopper.

5. The control system of claim 1, wherein the one or more processors are configured to generate the control signal in response to the measured current differing from the expected current through the resistor leg by more than a designated threshold that is non-zero.

6. The control system of claim 1, wherein the traction bus electrically connects an alternator to one or more traction motors on the vehicle, the alternator mechanically coupled to the engine via a shaft.

7. The control system of claim 1, wherein, responsive to the one or more processors determining that the measured current differs from the expected current, the one or more processors are also configured to one or more of generate an alert to notify an operator that the resistor leg is abnormal, increase cooling to the one or more resistive elements of the resistor leg, restrict movement of the vehicle, or schedule maintenance for the resistor leg.

8. The control system of claim 1, wherein, in response to the one or more processors determining that the measured current does not differ from the expected current by more than a designated threshold, the one or more processors are configured to generate a control signal configured to decrease the engine speed of the engine or maintain the engine speed of the engine at a current speed.

9. The control system of claim 1, wherein the vehicle is an off-highway land-based vehicle.

10. The control system of claim 1, wherein the vehicle is a hybrid vehicle.

11. The control system of claim 1, wherein the resistor leg is a first resistor leg of multiple resistor legs disposed within a grid box onboard the vehicle, each of the resistor legs including a respective braking chopper, wherein the current sensor that is configured to monitor the measured current conducted through the first resistor leg is a first current sensor of multiple current sensors that are each configured to monitor measured current conducted through a different corresponding one of the resistor legs in the grid box, and
    wherein the one or more processors are communicatively connected to the multiple current sensors, the one or more processors configured to receive the measured currents from the multiple current sensors and generate the control signal in response to any of the measured currents differing from respective expected currents through the resistor legs.

12. The control system of claim 1, wherein the control signal is configured to increase the engine speed of the engine from an idle speed to an active speed.

13. The control system of claim 1, wherein the control signal is a first control signal and the one or more processors are further configured to generate a second control signal that increases cooling to the one or more resistive elements of the resistor leg.

14. A method comprising:
    calculating an expected current through a resistor leg electrically connected to a traction bus on a vehicle, the resistor leg including a braking chopper and one or more resistive elements;
    comparing the expected current through the resistor leg to a measured current through the resistor leg generated by a current sensor; and
    responsive to determining a difference between the expected current and the measured current that exceeds a designated threshold, generating, via one or more processors, a control signal configured to increase an engine speed of an engine of the vehicle.

15. The method of claim 14, wherein the expected current is calculated based on a link voltage and a duty cycle of the braking chopper.

16. The method of claim 14, wherein the control signal is configured to increase the engine speed of the engine from an idle speed to an active speed prior to the vehicle transitioning from a dynamic braking mode of operation in which electrical energy is generated by a traction motor of the vehicle to a propel mode of operation in which power is supplied by the engine to the traction motor to propel the vehicle.

17. The method of claim 14, wherein, responsive to determining the difference that exceeds the designated threshold, the method includes one or more of generating an alert to notify an operator that the resistor leg is abnormal, increasing cooling to the one or more resistive elements of the resistor leg, restricting movement of the vehicle, or scheduling maintenance for the resistor leg.

18. The method of claim 15, further comprising calculating an expected effective resistance by dividing a known nominal resistance of the resistor leg by a commanded chopper percent value according to the duty cycle and dividing the link voltage by the expected effective resistance to determine the expected current, wherein the commanded chopper percent value represents a percentage of time that the braking chopper is commanded by a control unit to be in a closed state to conduct electric current from the traction bus through the braking chopper to the one or more resistive elements.

19. A control system comprising:
a current sensor configured to be disposed onboard a vehicle and to monitor a measured current conducted through a resistor leg of the vehicle, the resistor leg having a braking chopper and one or more resistive elements, the resistor leg electrically connected to a traction bus of the vehicle; and
one or more processors communicatively connected to the current sensor, the one or more processors configured to control one or both of the braking chopper or a traction motor of the vehicle in both a dynamic braking mode of operation where electrical energy is generated by the traction motor and in a propel mode of operation where electrical energy is provided to the traction motor to move the vehicle,
wherein the one or more processors are configured to receive the measured current from the current sensor, and, during the dynamic braking mode of operation, to determine whether the measured current differs from an expected current through the resistor leg by more than a designated threshold,
wherein, in response to the measured current differing from the expected current through the resistor leg by more than the designated threshold, the one or more processors are configured to generate a control signal that increases an engine speed of an engine of the vehicle to above an idle speed of the engine prior to transitioning from the dynamic braking mode of operation to the propel mode of operation.

20. The control system of claim 19, wherein the control signal is a first control signal and the one or more processors are further configured to generate a second control signal that increases cooling to the one or more resistive elements of the resistor leg.

* * * * *